(12) United States Patent
Di Lalla

(10) Patent No.: US 6,745,039 B1
(45) Date of Patent: Jun. 1, 2004

(54) SELF-CONFIGURABLE PAGING SYSTEM FOR A CELLULAR TELECOMMUNICATIONS NETWORK

(75) Inventor: Luciano Di Lalla, Montreal (CA)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 0 days.

(21) Appl. No.: 09/546,249

(22) Filed: Apr. 10, 2000

(51) Int. Cl.$^7$ ................................................. H04Q 7/20
(52) U.S. Cl. ................. 455/458; 455/456.1; 455/456.2; 455/422.1
(58) Field of Search .................. 455/456, 458, 455/422, 448, 440, 435, 432, 433, 426, 403, 456.1, 422.1, 435.1, 432.1, 426.1; 340/311.2, 313, 7.2

(56) References Cited

U.S. PATENT DOCUMENTS

| | | | | |
|---|---|---|---|---|
| 5,369,681 A | * | 11/1994 | Boudreau et al. | 455/41 |
| 5,737,702 A | | 4/1998 | Madhavapeddy et al. | 455/422 |
| 5,875,400 A | * | 2/1999 | Madhavapeddy et al. | 455/458 |
| 5,953,667 A | | 9/1999 | Kauppi | 455/440 |
| 6,023,624 A | * | 2/2000 | Hanson | 455/422 |
| 6,035,203 A | * | 3/2000 | Hanson | 455/458 |
| 6,292,667 B1 | * | 9/2001 | Wallentin et al. | 455/458 |
| 6,351,641 B2 | * | 2/2002 | Verkama | 455/426.1 |

* cited by examiner

Primary Examiner—Sonny Trinh
(74) Attorney, Agent, or Firm—Smith & Danamraj, P.C.

(57) ABSTRACT

A self-configurable system and method in a cellular telecommunications network for efficiently paging for mobile stations that last registered in a particular cell by automatically adjusting the size of an initial paging area on a per-cell basis. A plurality of sets of cells surrounding the particular cell are identified as Paging Depths (PDs) and are stored in a lookup table in a serving Mobile Switching Center (MSC). The PDs contain varying numbers of cells, and a first PD is selected to utilize for the particular cell's initial paging area. A plurality of paging attempts are then performed for mobile stations that last registered in the particular cell, and a statistical processor compiles statistics regarding the paging efficiency (percentage of mobile stations found versus total system resources used) and the success rate (percentage of paging attempts that were successful at locating mobile stations within the first PD). If the statistics indicate that the success rate was below a first threshold, the method increases the PD so as to select a set of cells having a greater number of cells than the first set of cells for the particular cell's initial paging area. If the statistics indicate that the success rate was above a first threshold, and the paging efficiency was above a second threshold, the method decreases the PD so as to select a set of cells having a lesser number of cells than the first set of cells.

7 Claims, 3 Drawing Sheets

SELF-CONFIGURABLE PAGING SYSTEM FOR A CELLULAR TELECOMMUNICATIONS NETWORK

BACKGROUND OF THE INVENTION

1. Technical Field of the Invention

This invention relates to telecommunication systems and, more particularly, to a self-configurable paging system for a cellular telecommunications network that automatically adjusts the size of a paging area on a per-cell basis.

2. Description of Related Art

Locating mobile stations (MSs) in a cellular telecommunications network is a critical function for the delivery of telecommunications services. The paging operation utilized, however, is a time-intensive and resource-intensive operation. For this reason, many methodologies have been developed over the years in an attempt to reduce the amount of time and resources required for the paging function. For example, instead of paging for an MS in every cell across an entire network, prior art solutions have defined staged paging methodologies in which the paging is done in stages. Smaller areas are defined where a paging attempt is first made, and then progressively wider areas are paged until the MS responds, or the page attempt fails. In a typical paging scenario, an MS may first be paged in a Location Area (LA) which is a group of cells related to the last cell in which the MS was registered. If the MS is not found, the search area is widened to a Paging Area (PA) which is a group of LAs. Finally, if the MS is not found in the PA, a network-wide page attempt may be performed in an area know as a System Area (SA).

In current networks, MSs may typically perform periodic registrations with the network every 10–15 minutes, although this time period may be considerably longer in some areas. MSs also register whenever they move from one LA to another. At registration, the identity of the cell (CellID) where the MS is located is converted into an LA. The LA is then temporarily stored in the Visitor Location Register (VLR) in the currently serving Mobile Switching Center (MSC) in case the MS needs to be located. When the MS needs to be located for delivery of a terminating call, Short Message Service (SMS) message, etc., current systems initially page for the MS simultaneously in all of the cells in the LA where the last registration was performed.

One problem with this existing solution is that the smallest area in which the subscriber is paged, the LA, may still represent a sizeable area, and may still require a large amount of system resources for the first page attempt. Some LAs, for example, can contain several hundred cells. Since the MS can only be in one cell at one time, paging in an entire LA is still a large waste of resources.

Additional proposals have been made to further narrow the initial paging area. One such proposal uses an initial paging area called a Neighbor Area (NA). In this solution, a neighbor list is stored for each cell (i.e., a list of cells adjacent to each cell). When an MS registers, the CellID is used to identify a neighbor list which then defines the NA for the first page attempt. If the MS is not located in the NA, the search is then widened to the LA, the PA, and the SA.

All of the prior art systems and methods for paging, however, still suffer serious disadvantages. First, these methods are implemented network wide, and do not take into account the varying sizes and geographies of the cells or the varying degrees of mobility of the subscribers in different areas. For example, while it may be efficient to search in the NA surrounding a large macrocell, it may not be appropriate to search in the NA of a microcell that is surrounded by other microcells because the area is too small, and the probability of finding the MS there is too low. Likewise, it may be efficient to search in the NA of a cell located in a downtown area where subscribers are generally slow moving, but it may not be appropriate along a highway.

A second disadvantage with the prior art methods is that they are implemented in a static manner. They do not take into account dynamic changes in the network and in subscriber behavior that may negatively impact the effectiveness of a static paging methodology.

In order to overcome the disadvantage of existing solutions, it would be advantageous to have a self-configurable paging system and method for a cellular telecommunications network that automatically adjusts the size of a paging area on a per-cell basis. The present invention provides such a system and method.

SUMMARY OF THE INVENTION

In one aspect, the present invention is a method in a cellular telecommunications network of automatically adjusting the size of a paging area on a per-cell basis. The method includes the steps of selecting an initial set of cells to utilize for a particular cell's paging area; determining a paging efficiency for a plurality of paging attempts within the initial set of cells; and automatically adjusting the number of cells in the particular cell's paging area if the paging efficiency falls outside an acceptable range.

In another aspect, the present invention is a method in a cellular telecommunications network of efficiently paging for mobile stations that last registered in a particular cell. The method begins by storing in a database, a plurality of sets of cells surrounding the particular cell. The sets of cells contain varying numbers of surrounding cells, and a first set of cells is selected to utilize for the particular cell's initial paging area. This is followed by performing a plurality of paging attempts for mobile stations that last registered in the particular cell, and compiling statistics regarding how many of the plurality of paging attempts were successful at locating mobile stations within the first set of cells. If the statistics indicate that fewer paging attempts were successful than desired, the method selects a set of cells having a greater number of cells than the first set of cells. If, however, the statistics indicate that the paging efficiency was higher than desired using the first set of cells, the method selects a set of cells having a lesser number of cells than the first set of cells only if the predicted success rate for this set of cells would still be acceptable.

In yet another aspect, the present invention is a system in a cellular telecommunications network for efficiently paging for mobile stations that last registered in a particular cell. The system includes a database for storing a plurality of sets of cells surrounding the particular cell that contain varying numbers of surrounding cells. The system also includes a paging controller for selecting a first set of cells to utilize for the particular cell's initial paging area, and for automatically adjusting the number of cells in the particular cell's paging area if the number of successful page attempts/paging efficiency falls outside an acceptable range. Paging resources such as paging channels are used to perform a plurality of paging attempts for mobile stations that last registered in the particular cell. A statistical processor compiles statistics regarding how many of the plurality of paging attempts were successful at locating mobile stations within the first set of cells, the statistics being utilized by the paging controller to automatically adjusting the number of cells in the particular cell's initial paging area.

BRIEF DESCRIPTION OF THE DRAWINGS

The invention will be better understood and its numerous objects and advantages will become more apparent to those skilled in the art by reference to the following drawings, in conjunction with the accompanying specification, in which.

DETAILED DESCRIPTION OF EMBODIMENTS

The present invention utilizes the existing concept of paging at different Paging Depths (PDs), and adds the capability to the system to self-configure the PD on a per-cell basis. The PD is the number of layers of neighbor cells which are used to perform a page. For example, if only a cell and its adjacent neighbor cells are used to perform a page, the PD=1; if the cell, its neighbors, and its neighbors' neighbor cells are used, the PD=2.

Over time, the system collects and analyzes statistics on the paging efficiency and success rate at finding MSs at different paging depths for each cell. The PD for each cell is then automatically varied, depending on the PD that has been shown to be most efficient in locating MSs for each cell. The system calculates a paging efficiency relating to the percentage of mobile stations found, and calculates a success rate relating to the percentage of paging attempts that are successful at finding a mobile station on the initial paging attempt at a particular PD. The paging efficiency and success rate are then utilized to determine when a change in paging depth is needed. The paging success rate is used for increases, and the paging efficiency and success rate are used for decreases. Additionally, statistics are used to predict what the effect of changing the PD would be before the change is made. The paging efficiency and success rate are utilized as the determining factors since the object of the invention is to find the maximum number of MSs while utilizing the least amount of network resources.

Figure 1:
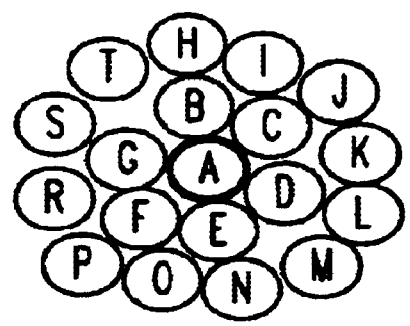
FIG. 1 is an illustrative drawing of a portion of a cellular telecommunications network having cells of approximately equal size in which the system and method of the present invention may be practiced.

FIG. 1 is an illustrative drawing of a portion of a cellular telecommunications network having cells of approximately equal size in which the system and method of the present invention may be practiced. For Cell A, an initial search area with a PD=1 may include Cells A–G. An initial search area with a PD=2 may include Cells A–T. The cells contained in each PD can be defined on a per-cell basis to take into account the different geographics of each cell and different subscriber mobility patterns.

If an MS last registered in Cell A, the system may initially page in Cell A and neighboring Cells B–G (PD=1). If the MS is not found in the first page attempt, the search area may be widened, for example, to PD=2 (or some larger area such as the LA) on the second page attempt. Over time, statistics are gathered on a per-cell basis regarding the paging efficiency/success rate for finding the MS at PD=1. Statistics are also compiled on what percentage of MSs would have been found at an initial PD=2, given that they were not found at PD=1. If a significant number of MSs are not found at PD=1 for Cell A, but would have been found at PD=2, then PD=1 may not be paged for this CellID. Instead, the system may configure itself to go straight to PD=2 for Cell A while other cells that have had greater success at PD=1 continue to initially page at PD=1. The comparison is made against a success threshold (Threshold-1) which is configurable by the system operator and may be set, for example, to a value of 80 percent.

In order to implement the varying PDs, the present invention stores the serving CellID in the VLR. A lookup table translates the CellID into a list of cells included at each PD level. The results of the statistical processing are input to a control algorithm which selects the initial PD for each cell.

Figure 2:
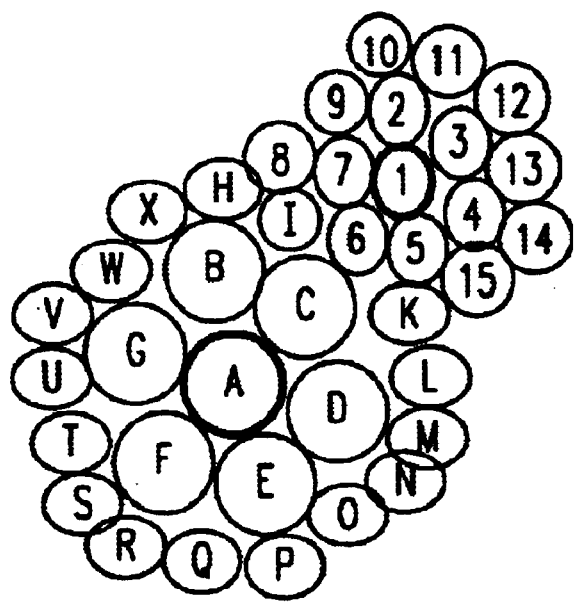
FIG. 2 is an illustrative drawing of a portion of a cellular telecommunications network having cells of differing sizes in which the system and method of the present invention may be practiced.

FIG. 2 is an illustrative drawing of a portion of a cellular telecommunications network having cells of differing sizes in which the system and method of the present invention may be practiced. In the example shown in FIG. 2, Cell A is a macrocell surrounded by other macrocells. Because of the large size of these cells, it is more likely that an MS that was last registered in Cell A will still be in Cell A or Cells B–G (i.e., PD=1). Therefore, the initial paging depth for Cell A may be set at PD=1. This may change over time if statistics show that due to a high degree of subscriber mobility, an initial paging depth of PD=2 would be more effective.

Cell 1, on the other hand, is illustrated as a microcell surrounded by other microcells. Because of the small size of these cells, it is more likely that an MS that was last registered in Cell 1 will have moved beyond Cell 1 and its neighboring cells, Cells 2–7 (i.e., PD=1). Therefore, the initial paging depth for Cell 1 may be set at PD=2. This also may change over time if statistics show that due to a low degree of subscriber mobility, an initial paging depth of PD=1 would be more efficient. In other words, over time, a cell with initial PD=2 may demonstrate a paging efficiency at PD=2 that exceeds a second (higher) threshold (for example, 90 percent). This indicates that the initial paging area is too wide. Therefore, the system configures itself to fall back to PD=1.

Of course, additional paging depths may be defined, and the geographical layout of the cells included at each paging depth may not be symmetrical, but may follow underlying terrain or subscriber mobility patterns. Since the system continuously analyzes the paging statistics, should any of these factors change, the system reconfigures itself to achieve an optimum paging solution.

The system may also consider the elapsed time since the MS's last registration when selecting the initial PD level. As the time increases from the last registration, it becomes more likely that a subscriber would move out of the cells included at PD=1, for example. Therefore, the system may increase the initial PD level for subscribers whose last location update occurred outside a predefined time period.

As noted above, MSs register with the cellular network whenever they move from one location area to another. Within a particular location area, cellular networks use a process known as periodic registration to keep track of which MSs are active. The time period between periodic registrations is set by the system operator. The period depends on the system operator, the level of congestion in the network, and the mobility of the served subscribers. Typically, periodic registrations may occur approximately every 10–15 minutes, although in some areas the time period may be increased to several hours. Therefore, it is possible for an MS to travel through a neighbor cell to a second level cell between periodic registrations. Especially if the neighbor cells are microcells.

Therefore, the system of the present invention may consider the elapsed time since the last registration when compiling statistics for different cells in the network. The statistics may show, for example, that for Cell A, if a page attempt is made within 5 minutes of the last periodic registration, a PD=1 provides a paging efficiency that is over the success threshold (Threshold-1) value. However, if the page attempt is made more than 5 minutes after the last periodic registration, a PD=1 is insufficient, and the cell has to switch to a PD=2 to achieve the required paging efficiency.

Figure 3:
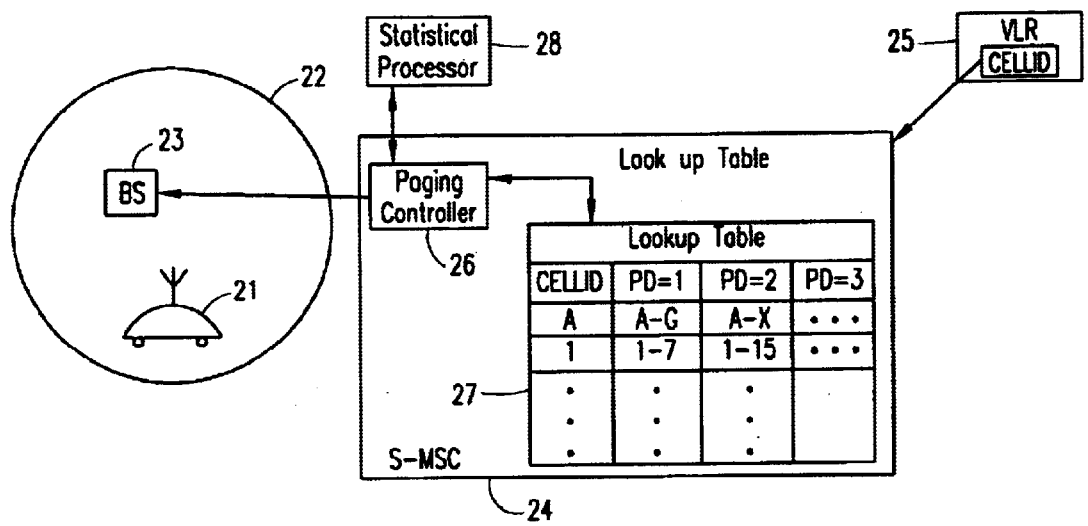
FIG. 3 is a simplified block diagram of the system of the present invention.

FIG. 3 is a simplified block diagram of the system of the present invention. An MS 21 is illustrated within a cell 22 that is being generated by a Base Station (BS) 23. The BS is connected to a Serving Mobile Switching Center (S-MSC) 24 that is currently serving the MS. Associated with the S-MSC is a Visitor Location Register (VLR) 25 in which subscriber information for the MS has been downloaded from the MS's Home Location Register (HLR) (not shown). The S-MSC includes a paging controller 26 which includes a control algorithm for selecting the PD level for each cell. The paging controller accesses a lookup table 27 which associates CellIDs with lists of cells that are included in the search area at each paging depth (for example, PD=1, PD=2, etc.). A statistical processor 28 performs post processing on the results of paging attempts in each cell, calculates paging efficiencies/success rates, and compares the paging efficiencies/success rates to the predefined Threshold-1 and Threshold-2. The results of the statistical analysis are sent to the paging controller. Thereafter, the PD for each cell may be automatically changed if the calculated paging efficiency/success rate at a given PD exceeds Threshold-1 or Threshold-2.

Figure 4:
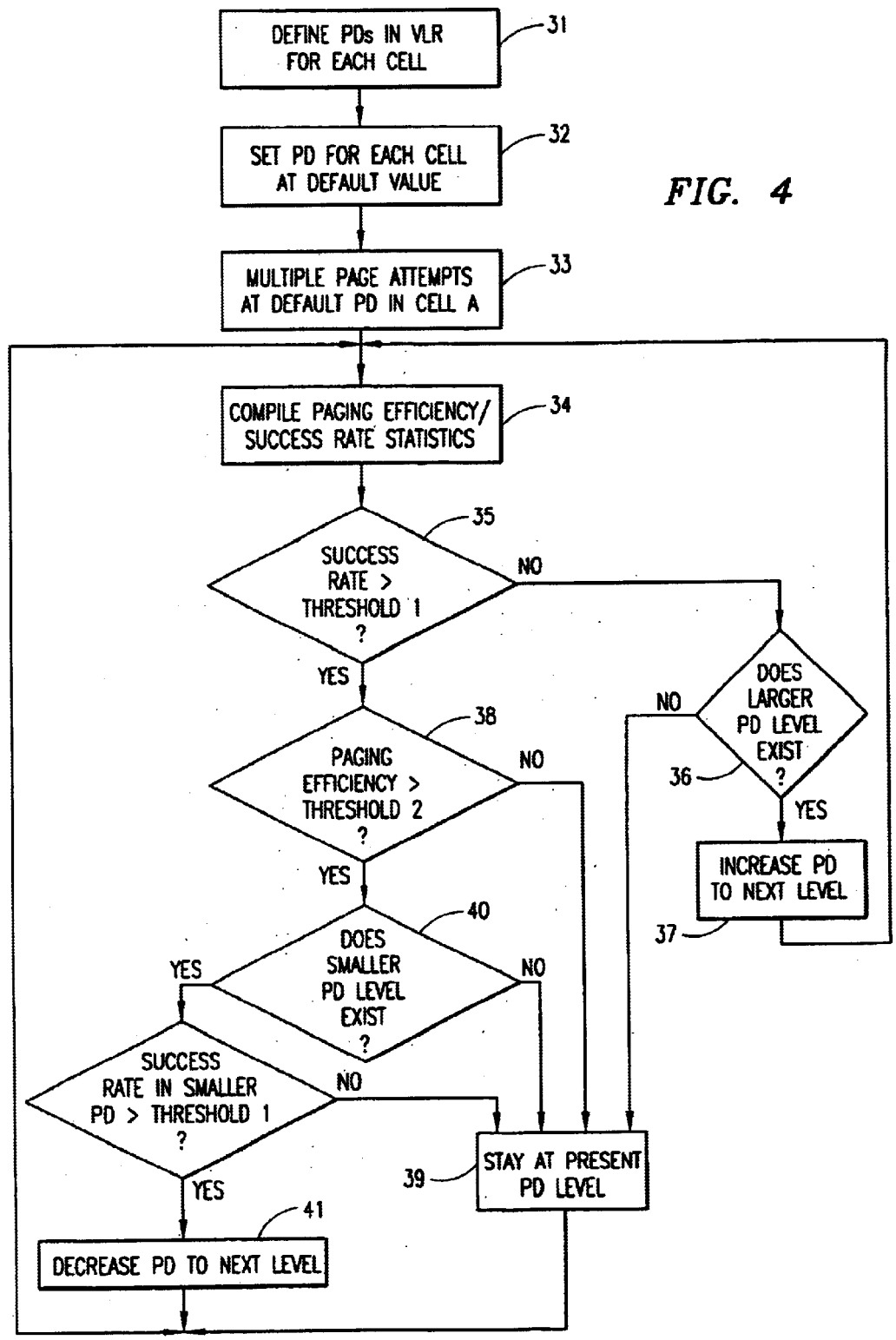
FIG. 4 is a flow chart illustrating the steps of the preferred embodiment of the method of the present invention.

FIG. 4 is a flow chart illustrating the steps of the preferred embodiment of the method of the present invention. With reference to FIGS. 2, 3, and 4, the process will now be described. The process begins at step 31 where the cells that comprise the search areas at each PD level are defined for each cell in the lookup table 27 in the MSC 24. For example, for Cell A of FIG. 2, the cells in PD=1 may be defined as Cells A–G; for Cell 1, the cells in PD=2 may be defined as Cells 1–15; etc.

At step 32, the process is in a start-up mode, so the PD for each cell is set to a default value. For example, the default value for Cell A may be PD=1 while the default value for Cell 1 may be PD=2. The cellular network then proceeds to perform as usual, including performing multiple page attempts at step 33 for MSs for which the last registration was, for example, in Cell A. This process can be applied in an environment in which the paging depth keeps increasing on subsequent page attempts until either the mobile station is found or a page failure occurs. It can equally be applied in a more traditional paging scheme where the LA, PA, and then the SA are sequentially searched by using the PD=x as the first page attempt.

At step 34, the statistical processor 28 compiles paging efficiency/success rate statistics over a period of time for Cell A operating with the initial PD set at PD=1. The success rate is defined as the percentage of paging attempts that were successful at locating mobile stations within the first PD, and the paging efficiency is defined as the percentage of mobile stations found versus total system resources used. The time period is set long enough to avoid oscillating paging depths and changes due to temporary phenomena. At step 35, it is determined whether or not the paging success rate of initial page attempts at PD=1 is greater than Threshold-1. If not, an insufficient number of MSs were located when paging was performed in the group of cells comprising PD=1. Therefore, the process moves to step 36 where it is determined whether a larger PD level exists. If not, the process moves to step 39, and the initial PD remains at its present level. If a larger PD exists, the process moves to step 37 where the initial PD is increased to the next level, in this case PD=2. The process then returns to step 34.

Once again, the statistical processor 28 compiles paging efficiency/success rate statistics over time for Cell A at step 34, with the initial PD set at PD=2. At step 35, it is determined whether or not the paging success rate of initial page attempts at PD=2 is greater than Threshold-1. If not, the process again adjusts the PD upward at steps 36 and 37 until a maximum PD is reached. If it is determined that the initial paging success rate for Cell A operating at its present initial PD level exceeded the Threshold-1 value, the process moves from step 35 to step 38 where it is determined whether or not the initial paging efficiency at the present PD level is greater than Threshold-2. A paging efficiency exceeding Threshold-2 would indicate that the initial search area is too wide, and paging resources are being used unnecessarily. If the paging efficiency does not exceed Threshold-2, then the cell is operating in the proper range, and the process moves to step 39 where the cell remains at its present PD level. If the paging efficiency is greater than Threshold-2, and the statistics predict that the paging success rate would be greater than Threshold-1 for a smaller PD, the process moves to step 40. In step 40, it is determined whether or not a PD level smaller than the current PD level exists and/or is allowed. If Cell A is operating with its initial PD set at the smallest level, the process moves to step 39 where Cell A stays at its present PD level. If Cell A is operating at a larger PD level, the process moves to step 41 where the initial PD level is decreased to the next lower level. After steps 39 or 41, the process returns to step 34 where paging efficiency statistics continue to be compiled.

Thus, it can be readily seen that over time, the present invention collects and analyzes statistics on the initial paging efficiency/success rate (i.e., the efficiency at finding MSs on the initial page attempt) at different PDs for each cell. The initial PD for each cell is then automatically varied if it falls outside an acceptable range defined by Threshold-1 and Threshold-2. By adjusting the initial PD, the system automatically configures each cell to operate in a paging range that has been shown to be most efficient in locating MSs last registered in that cell.

It is thus believed that the operation and construction of the present invention will be apparent from the foregoing description. While the system and method shown and described has been characterized as being preferred, it will be readily apparent that various changes and modifications could be made therein without departing from the scope of the invention as defined in the following claims.

What is claimed is:

1. A method in a cellular telecommunications network of automatically adjusting the size of an initial paging area, said method comprising the steps of:

selecting an initial set of cells to utilize for a particular cell's initial paging area;

determining a paging success rate and a paging efficiency for a plurality of initial paging attempts within the initial set of cells by compiling statistics regarding how many of the plurality of initial paging attempts were successful at locating mobile stations within the initial set of cells;

automatically increasing the number of cells in the particular cell's initial paging area if the paging success rate is below a first threshold level; and automatically decreasing the number of cells in the particular cell's initial paging area if the paging success rate is above the first threshold level and the paging efficiency is above a second threshold level.

2. The method of claim 1 wherein the step of automatically decreasing the number of cells in the particular cell's initial paging area also includes the steps of:

compiling statistics regarding the paging success rate of finding mobile stations within the decreased number of cells; and automatically decreasing the number of cells in the particular cell's initial paging area only if the paging success rate of finding mobile stations within the decreased number of cells is above the first threshold level.

3. A method in a cellular telecommunications network of automatically adjusting a number of cells in an particular cell's initial paging area, said method comprising the steps of:

setting a first paging depth (PD) level, said PD level identifying a first set of cells for the particular cell's initial paging area;

performing a plurality of paging attempts for mobile stations that last registered in the particular cell;

compiling statistics regarding how many of the plurality of paging attempts were successful at locating mobile stations within the first set of cells;

automatically adjusting the number of cells in the particular cell's initial paging area if the number of successful page attempts falls outside an acceptable ranges;

setting a second PD level for the particular cell's initial paging area whenever the number of successful page attempts is below the acceptable range, said second PD level identifying a second set of cells having a greater number of cells than the first set of cells; and setting a third PD level for the particular cell's initial paging area whenever the number of successful page attempts is above the acceptable range and the paging efficiency is sufficient, said third PD level identifying a third set of cells having a lesser number of cells than the first set of cells.

4. The method of claim 3 wherein the step of compiling statistics regarding how many of the plurality of paging attempts were successful includes compiling statistics that indicate how many of the plurality of paging attempts were successful at various elapsed time periods following each mobile station's last registration in the particular cell.

5. The method of claim 4 further comprising setting a second PD level for the particular cell's initial paging area whenever the statistics indicate that the number of successful page attempts is below the acceptable range for the elapsed time period since the paged mobile station's last registration, said second PD level identifying a second set of cells having a greater number of cells than the first set of cells.

6. A method in a cellular telecommunications network of efficiently paging for mobile stations that last registered in a particular cell, said method comprising the steps of:

storing in a database, a plurality of sets of cells surrounding the particular cell, said sets of cells containing varying numbers of surrounding cells;

selecting a first set of cells to utilize for the particular cell's initial paging area;

performing a plurality of paging attempts for mobile stations that last registered in the particular cell;

compiling paging efficiency statistics regarding a percentage of mobile stations that were found in the first set of cells and success rate statistics regarding how many of the plurality of paging attempts were successful at locating mobile stations within the first set of cells;

selecting a set of cells having a greater number of cells than the first set of cells if the success rate statistics indicate that fewer paging attempts were successful than desired; and selecting a set of cells having a lesser number of cells than the first set of cells if the success rate statistics and the paging efficiency statistics indicate that the success rate and the paging efficiency were greater than desired.

7. A system in a cellular telecommunications network for efficiently paging for mobile stations that last registered in a particular cell, said system comprising:

a database for storing a plurality of sets of cells surrounding the particular cell, said sets of cells containing varying numbers of surrounding cells;

a paging controller for selecting a first set of cells to utilize for the particular cell's initial paging area, and for automatically adjusting the number of cells in the particular cell's initial paging area if the number of successful page attempts falls outside an acceptable range;

paging resources for performing a plurality of paging attempts for mobile stations that last registered in the particular cell; and a statistical processor for compiling paging efficiency statistics regarding a percentage of mobile stations that were found in the first set of cells and success rate statistics regarding how many of the plurality of paging attempts were successful at locating mobile stations within the first set of cells, the statistics being utilized by the paging controller to automatically adjusting the number of cells in the particular cell's initial paging area and for selecting a set of cells having a greater number of cells than the first set of cells if the success rate statistics indicate that fewer paging attempts were successful than desired and for selecting a set of cells having a lesser number of cells than the first set of cells if the success rate statistics and the paging efficiency statistics indicate that the success rate and the paging efficiency were greater than desired.

* * * * *